(12) United States Patent
Chang et al.

(10) Patent No.: US 10,865,221 B2
(45) Date of Patent: Dec. 15, 2020

(54) PHOSPHORUS-CONTAINING FLAME RETARDANT, PREPARATION METHOD THEREOF, RESIN COMPOSITION COMPRISING THE PHOSPHORUS-CONTAINING FLAME RETARDANT AND ARTICLE MADE THEREFROM

(71) Applicant: Elite Material Co., Ltd., Taoyuan (TW)

(72) Inventors: Shu-Hao Chang, Taoyuan (TW); Zhilong Hu, Zhongshan (CN); Ching-Hsien Hsu, Taoyuan (TW)

(73) Assignee: ELITE MATERIAL CO., LTD., Taoyuan (TW)

( * ) Notice: Subject to any disclaimer, the term of this patent is extended or adjusted under 35 U.S.C. 154(b) by 179 days.

(21) Appl. No.: 15/977,127

(22) Filed: May 11, 2018

(65) Prior Publication Data
US 2019/0300556 A1    Oct. 3, 2019

(30) Foreign Application Priority Data
Mar. 27, 2018  (CN) .......................... 2018 1 0258299

(51) Int. Cl.
| C09K 21/12 | (2006.01) |
| C07F 9/6571 | (2006.01) |
| C09D 5/18 | (2006.01) |
| C09D 123/02 | (2006.01) |
| C09D 171/12 | (2006.01) |
| C09D 123/08 | (2006.01) |
| C08K 5/5313 | (2006.01) |

(52) U.S. Cl.
CPC .......... *C07F 9/657163* (2013.01); *C09D 5/18* (2013.01); *C09D 123/025* (2013.01); *C09D 123/0807* (2013.01); *C09D 171/12* (2013.01); *C09K 21/12* (2013.01); *C08K 5/5313* (2013.01)

(58) Field of Classification Search
CPC .......... C09D 123/025; C07F 9/657163; C07F 9/5325; C08K 5/0066; C08K 5/5313; C08K 5/49; C09K 21/12
See application file for complete search history.

(56) References Cited

U.S. PATENT DOCUMENTS

| 2009/0048377 A1* | 2/2009 | Kanno | ................ C08K 5/0066 524/117 |
| 2015/0332806 A1* | 11/2015 | Hayakawa | ........... H05K 1/0353 428/336 |
| 2018/0201761 A1* | 7/2018 | Xu | ......................... B32B 27/38 |

* cited by examiner

*Primary Examiner* — Peter D. Mulcahy
(74) *Attorney, Agent, or Firm* — Muncy, Geissler, Olds & Lowe, PC

(57) ABSTRACT

A phosphorus-containing flame retardant, a preparation method thereof, a resin composition comprising the phosphorus-containing flame retardant and an article made therefrom are disclosed. The phosphorus-containing flame retardant is characterized by having the advantages of high phosphorus content, high resin compatibility, not increasing gel time of varnish and low water absorption rate, and is therefore suitable for use as a flame retardant of various resin materials.

12 Claims, 4 Drawing Sheets

PHOSPHORUS-CONTAINING FLAME RETARDANT, PREPARATION METHOD THEREOF, RESIN COMPOSITION COMPRISING THE PHOSPHORUS-CONTAINING FLAME RETARDANT AND ARTICLE MADE THEREFROM

CROSS-REFERENCE TO RELATED APPLICATION

This application claims the priority benefit of China Patent Application No. 201810258299.9, filed on Mar. 27, 2018, the entirety of which is hereby incorporated by reference and made a part of this specification.

BACKGROUND

1. Field of the Disclosure

The present disclosure primarily relates to a phosphorus-containing flame retardant and more particularly to a phosphorus-containing flame retardant molecule containing two or more phosphorus atoms.

2. Description of Related Art

To promote the flame retardancy of a resin material, various flame retardants are generally added to the resin, such as halogen-containing flame retardants or phosphorus-containing flame retardants. Halogen-containing flame retardants have been prohibited or limited due to environmental issue, and mainstream resin materials newly developed do not contain halogen-containing flame retardants. On the other hand, most phosphorus-containing flame retardants, such as phosphorus-containing phenolic compounds, fail to provide sufficient flame retardancy due to their low phosphorus content. Accordingly, there is a need to provide a flame retardant with higher phosphorus content to achieve better flame retardancy.

SUMMARY

In one aspect, provided herein is a phosphorus-containing flame retardant of Formula (1):

Formula (1)

Y—O—Ar—O—Z wherein X represents

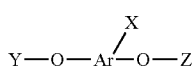 or 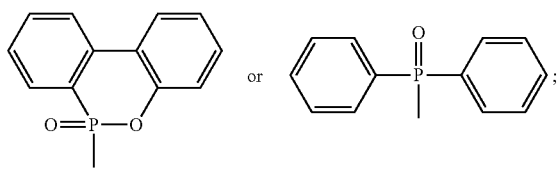 [SMILES: CP1(=O)Oc2ccccc2-c2ccccc21 ; CP(=O)(c1ccccc1)c1ccccc1];

Ar represents an aromatic group; and
Y and Z individually represent

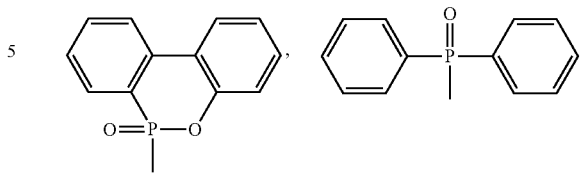

or hydrogen, and at least one of Y and Z is not hydrogen.

In one embodiment, Ar represents benzene, naphthalene or biphenyl.

In one embodiment, the phosphorus-containing flame retardant of Formula (1) comprises a structure of Formula (1-1), Formula (1-2) or Formula (1-3):

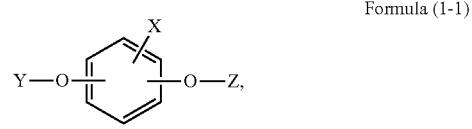

Formula (1-1)

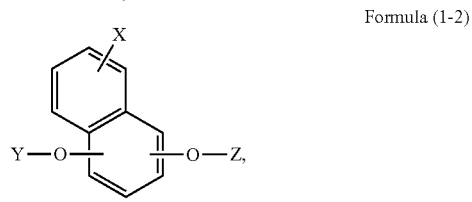

Formula (1-2)

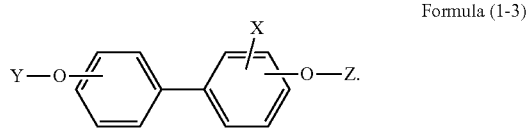

Formula (1-3)

In one embodiment, the phosphorus-containing flame retardant of Formula (1) comprises a structure of Formula (1-4):

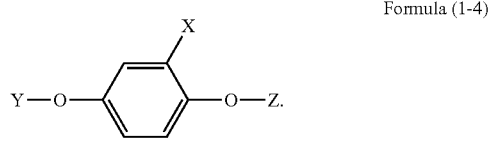

Formula (1-4)

In one embodiment, the phosphorus-containing flame retardant of Formula (1) comprises a structure of any one of Formula (2) to Formula (11):

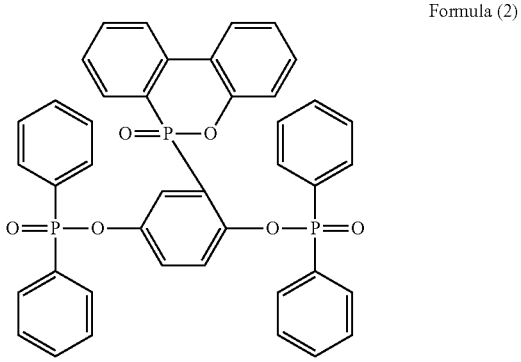

Formula (2)

Formula (3)
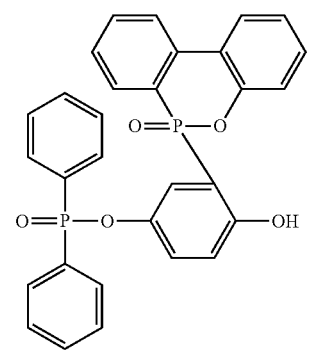
Formula (4)
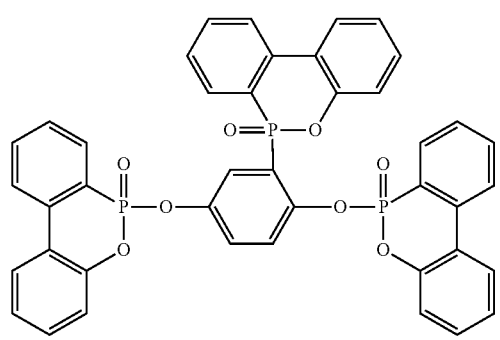
Formula (5)
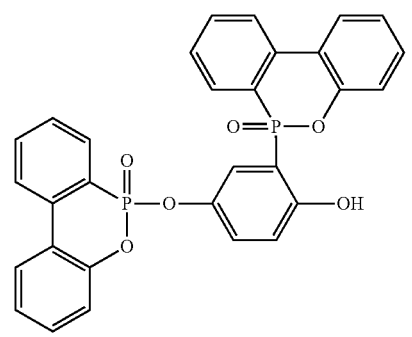
Formula (6)
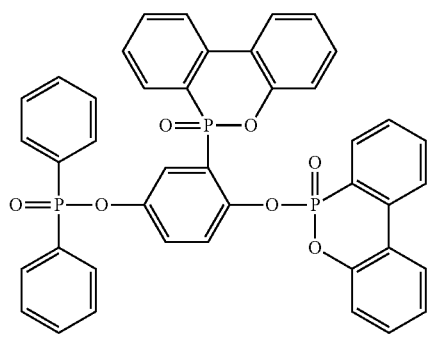
Formula (7)
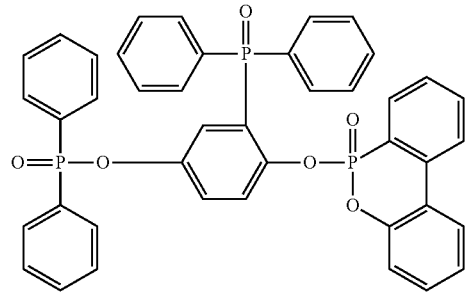
Formula (8)
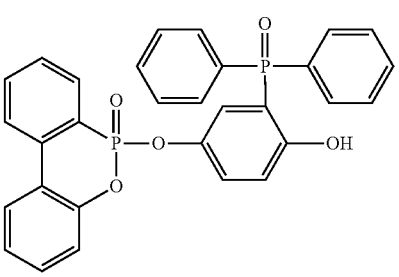
Formula (9)
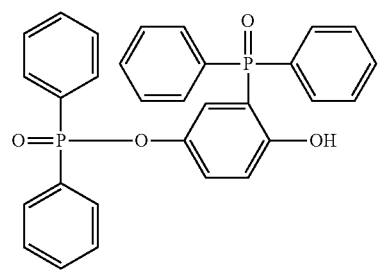
Formula (10)
Formula (11)
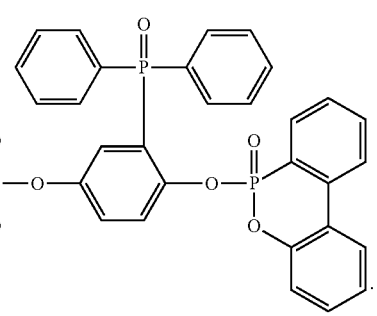
In one embodiment, the phosphorus-containing flame retardant of Formula (1) has a phosphorus content of greater than 10%, such as between 10% and 15%.

In one embodiment, the phosphorus-containing flame retardant of Formula (1) has a water absorption rate of less than 0.20%, such as between 0.10% and 0.20%.

In one aspect, provided herein is a method of preparing a phosphorus-containing flame retardant, comprising reacting a phosphorus-containing hydroxyl aromatic compound and a phosphorus-containing halide in the presence of a catalyst.

In one aspect, provided herein is a resin composition comprising the phosphorus-containing flame retardant of Formula (1) and any resin.

In one aspect, provided herein is an article made from the resin composition recited above, comprising a resin film, a resin-coated copper, a prepreg, a laminate or a printed circuit board.

DETAILED DESCRIPTION OF EMBODIMENTS

Figure 1:
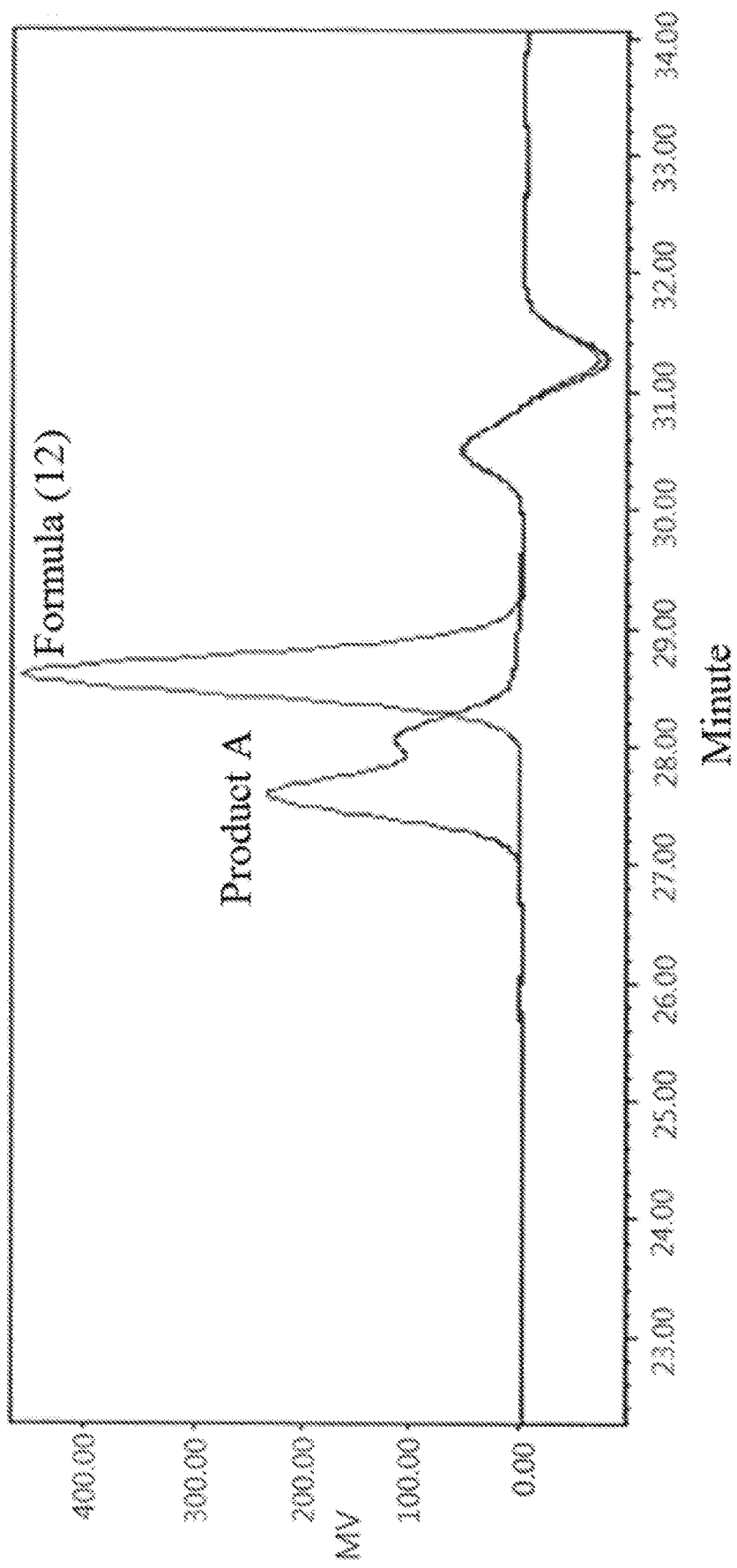
FIG. 1 illustrates the test result of GPC.

To enable those skilled in the art to further appreciate the features and effects of the present disclosure, words and terms contained in the specification and appended claims are described and defined. Unless otherwise defined, all technical and scientific terms used herein have the same meaning as commonly understood by those of ordinary skill in the art to which this disclosure pertains. In the case of conflict, the present document and definitions contained herein will control.

As used herein, the term "comprises," "comprising," "includes," "including," "has," "having" or any other variant thereof is construed as an open-ended transitional phrase intended to cover a non-exclusive inclusion. For example, a composition or article of manufacture that comprises a list of elements is not necessarily limited to only those elements but may include other elements not expressly listed or inherent to such composition or article of manufacture. Further, unless expressly stated to the contrary, the term "or" refers to an inclusive or and not to an exclusive or. For example, a condition "A or B" is satisfied by any one of the following: A is true (or present) and B is false (or not present), A is false (or not present) and B is true (or present), and both A and B are true (or present). In addition, whenever open-ended transitional phrases are used, such as "comprises," "comprising," "includes," "including," "has," "having" or any other variant thereof, it is understood that transitional phrases such as "consisting essentially of" and "consisting of" are also disclosed and included.

In this disclosure, features or conditions presented as a numerical range or a percentage range are merely for convenience and brevity. Therefore, a numerical range or a percentage range should be interpreted as encompassing and specifically disclosing all possible subranges and individual numerals or values therein, particularly all integers therein. For example, a range of "1 to 8" or "between 1 and 8" should be understood as explicitly disclosing all subranges such as 1 to 7, 2 to 8, 2 to 6, 3 to 6, 4 to 8, 3 to 8 and so on, particularly all subranges defined by integers, as well as disclosing all individual values such as 1, 2, 3, 4, 5, 6, 7 and 8. Unless otherwise defined, the aforesaid interpretation rule should be applied throughout the present disclosure regardless broadness of the scope.

Whenever amount, concentration or other numeral or parameter is expressed as a range, a preferred range or a series of upper and lower limits, it is understood that all ranges defined by any pair of the upper limit or preferred value and the lower limit or preferred value are specifically disclosed, regardless whether these ranges are explicitly described or not. In addition, unless otherwise defined, whenever a range is mentioned, the range should be interpreted as inclusive of the endpoints and every integers and fractions in the range.

Given the intended purposes and advantages of this disclosure are achieved, numerals or figures have the precision of their significant digits. For example, 40.0 should be understood as covering a range of 39.50 to 40.49.

As used herein, a Markush group or a list of items is used to describe examples or embodiments of the present disclosure. A skilled artisan will appreciate that all subgroups of members or items and individual members or items of the Markush group or list can also be used to describe the present disclosure. For example, when X is described as being "selected from a group consisting of $X_1$, $X_2$ and $X_3$," it is intended to disclose the situations of X is $X_1$ and X is $X_1$ and/or $X_2$. In addition, when a Markush group or a list of items is used to describe examples or embodiments of the present disclosure, a skilled artisan will understand that any subgroup or any combination of the members or items in the Markush group or list may also be used to describe the present disclosure. Therefore, when X is described as being "selected from a group consisting of $X_1$, $X_2$ and $X_3$" and Y is described as being "selected from a group consisting of $Y_1$, $Y_2$ and $Y_3$," the disclosure of any combination of X is $X_1$ and/or $X_2$ and/or $X_3$ and Y is $Y_1$ and/or $Y_2$ and/or $Y_3$.

The following embodiments and examples are illustrative in nature and are not intended to limit the present disclosure and its application. In addition, the present disclosure is not bound by any theory described in the background and summary above or the following embodiments or examples.

Phosphorus-Containing Flame Retardant

Provided herein is a phosphorus-containing flame retardant of Formula (1):

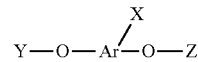

Formula (1)

wherein X represents

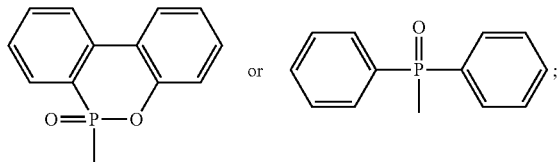

Ar represents an aromatic group; and
Y and Z individually represent

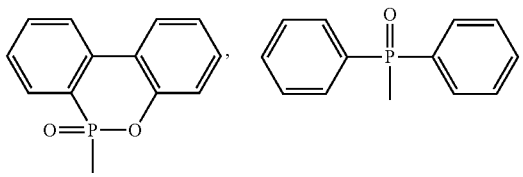

or hydrogen, and at least one of Y and Z is not hydrogen.

In one embodiment, Ar represents benzene, naphthalene or biphenyl, but not limited thereto. If Ar is a polycyclic aromatic functional group, X, Y and Z may be bonded to the same or different aromatic ring.

In one embodiment, the phosphorus-containing flame retardant of Formula (1) comprises a structure of Formula (1-1), Formula (1-2) or Formula (1-3):

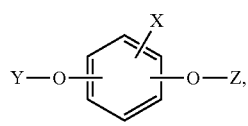

Formula (1-1)

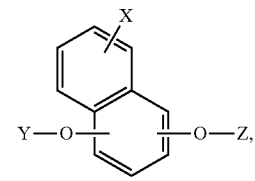

Formula (1-2)

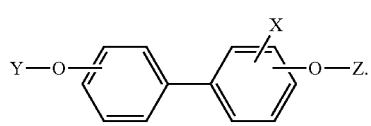

Formula (1-3)

In another embodiment, the phosphorus-containing flame retardant of Formula (1) comprises a structure of Formula (1-4):

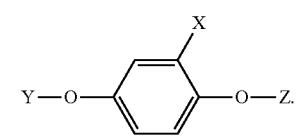

Formula (1-4)

Specifically, the phosphorus-containing flame retardant of Formula (1) may comprise a structure of any one of Formula (2) to Formula (11):

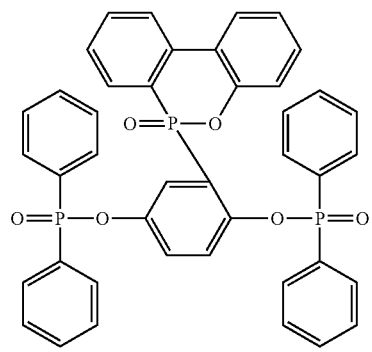

Formula (2)

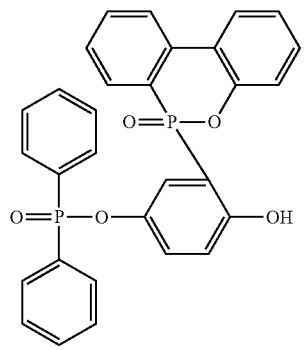

Formula (3)

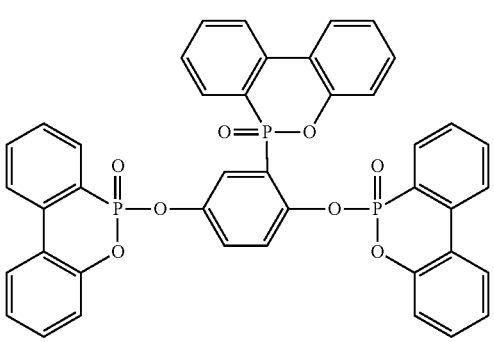

Formula (4)

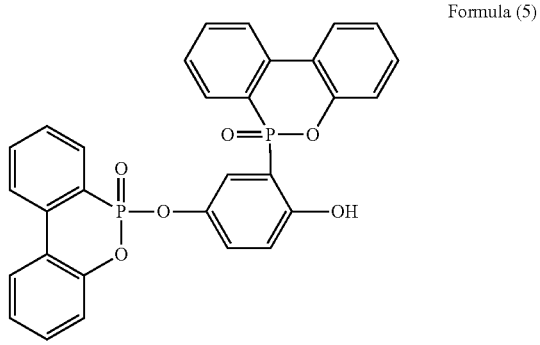

Formula (5)

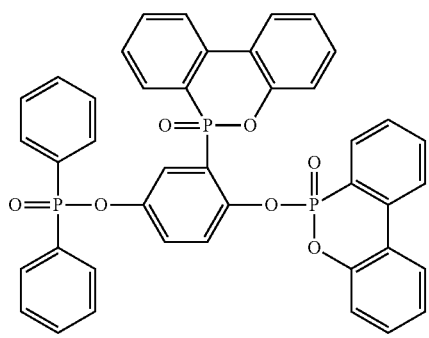

Formula (6)

Formula (7)

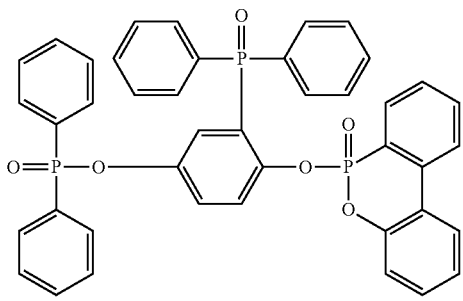

Formula (8)

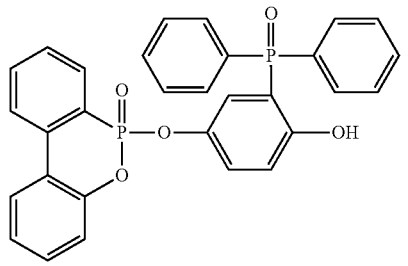

Formula (9)

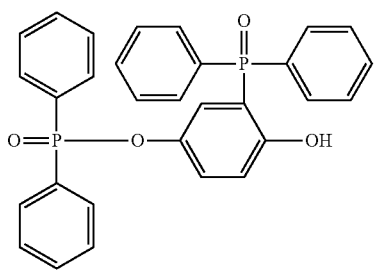

Formula (10)

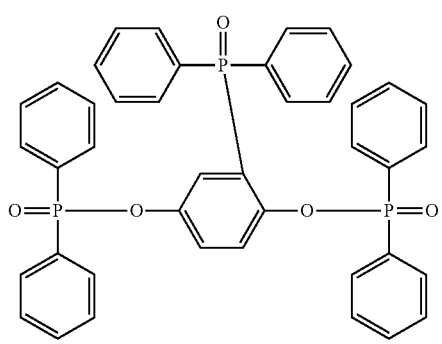

Formula (11)

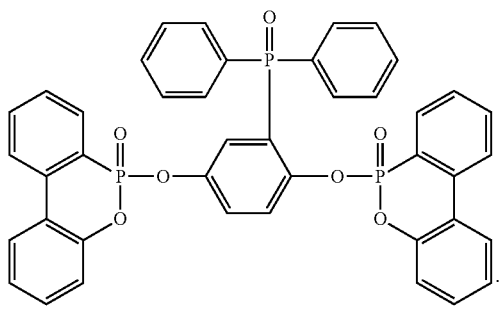

Phosphorus-containing flame retardants disclosed in various embodiments preferably have any one or more or all of the following properties:

1. The phosphorus-containing flame retardants have a phosphorus content per molecule of greater than 10%, such as between 10% and 15%, such as between 11.5% and 13.5%. Compared with conventional phosphorus-containing phenolic compounds, the phosphorus-containing flame retardants disclosed herein have a higher phosphorus content to enhance flame retardancy.

2. When the phosphorus-containing flame retardants disclosed herein are added to a resin system, such as a low polarity resin composition, a better compatibility is achieved and layer separation of the resin system and the flame retardants can be avoided.

3. Addition of the phosphorus-containing flame retardants disclosed herein to a resin system will not significantly increase the gel time of varnish of the resin composition; for example, the gel time of varnish can be maintained at between 220 and 280 seconds, so as to maintain the original reactivity of resin and enable the production of prepregs with a reasonable baking temperature and machine operation speed, thereby reducing the costs in energy, time and labor.

4. The phosphorus-containing flame retardants disclosed herein have a lower water absorption rate, such as less than 0.20%, preferably less than 0.15%, such as between 0.10% and 0.20%, which belong to flame retardants of low water absorption and have better thermal resistance after water absorption.

Preparation of Phosphorus-Containing Flame Retardant

Also disclosed herein is a method of preparing a phosphorus-containing flame retardant, comprising reacting a phosphorus-containing hydroxyl aromatic compound and a phosphorus-containing halide in the presence of a catalyst.

In one embodiment, the phosphorus-containing hydroxyl aromatic compound is an aromatic compound with one or two

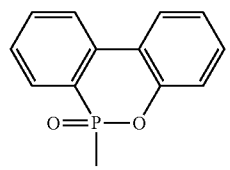 [SMILES: CP1(=O)Oc2ccccc2-c2ccccc21]

groups or

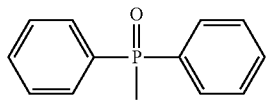

groups, such as a benzene, naphthalene or biphenyl compound.

For example, the phosphorus-containing hydroxyl aromatic compound comprises any one of the following structures:

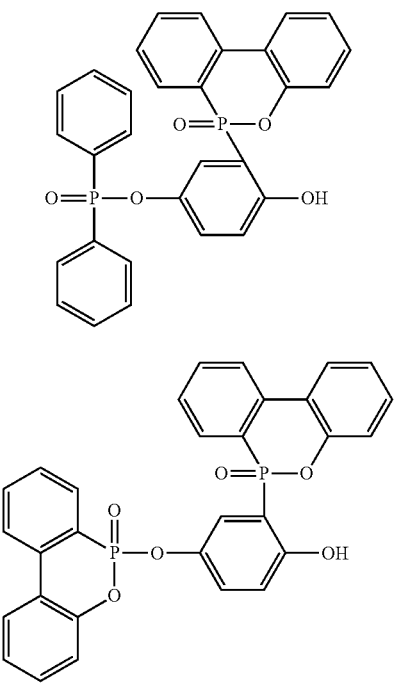

Formula (3)

Formula (5)

Formula (8)

Formula (9)

Formula (12)

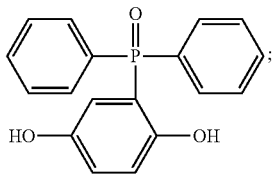

Formula (13)

preferably having a structure of Formula (12) or Formula (13).

In one embodiment, the phosphorus-containing halide refers to a halide with

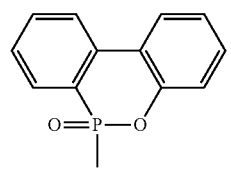

group or

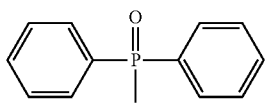

group, such as a chloride or a bromide. For example, the phosphorus-containing halide may comprise a structure of Formula (14) or Formula (15):

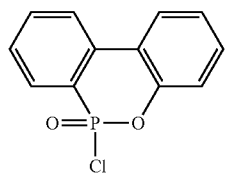

Formula (14)

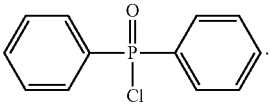

Formula (15)

In one embodiment, the catalyst used in the reaction comprises an alkaline compound and a Lewis acid. It is found that if the alkaline compound is added alone, the reaction is very slow and takes very long time; if the Lewis acid is added alone, no catalysis occurs.

In one embodiment, the amount of components used in the reaction is not particularly limited; for example, the molar ratio of the phosphorus-containing hydroxyl aromatic compound and the phosphorus-containing halide may be between 1:1 and 1:5, such as 1:1, 1:2, 1:3, 1:4 or 1:5.

In one embodiment, the reaction temperature may be controlled at 80° C. to 170° C. In one embodiment, the reaction time is controlled at less than or equal to 12 hours.

For example, in one embodiment, the phosphorus-containing hydroxyl aromatic compound is dissolved by a solvent, added with the alkaline compound and the Lewis acid as the catalyst, and the reaction temperature is con-

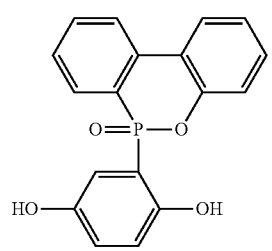

trolled at 80° C. to 170° C., such as between 120° C. and 160° C., with stirring and reacting for 0.5 to 5 hours, such as 1 to 3 hours, followed by the addition of the phosphorus-containing halide for reacting for 3 to 10 hours, after which the reaction product is filtered to remove impurities, and then the filtrate is added with pure water and the organic layer is extracted. Then the organic layer is added with methyl ethyl ketone and stirred to dissolve impurities; after rotary evaporation to remove the solvent, the solution is washed with pure water, dehydrated and then vacuum-dried to obtain one or more phosphorus-containing flame retardant according to the present disclosure.

In one embodiment, the alkaline compound may be an organic base, an inorganic base or a Lewis base, preferably comprising but not limited to: triethylamine ($Et_3N$), trimethylamine ($Me_3N$), sodium hydroxide (NaOH), potassium hydroxide (KOH), potassium hydride (KH), sodium hydride (NaH), sodium methoxide (NaOMe), dimethylamine ($Me_2NH$), boron trifluoride amine complex, ethyltriphenyl phosphonium chloride, triphenylphosphine, pyridine or imidazole. Pyridine may comprise, but not limited to, 4-dimethylaminopyridine; imidazole may comprise, but not limited to, 1H-benzimidazole, 2-methylimidazole, 2-phenyl-1H-imidazole, or 2-ethyl-4-methylimidazole.

In one embodiment, the Lewis acid may comprise, but not limited to, metal salt compounds, preferably comprising but not limited to metal salt compounds of manganese, iron, cobalt, nickel, copper and zinc, such as ferric chloride ($FeCl_3$), boron trifluoride ($BF_3$), trifluoromethanesulfonic acid (TFMSA), aluminium chloride ($AlCl_3$), zinc octanoate, cobalt octanoate, cobalt acetylacetonate, and zinc acetylacetonate.

Resin Composition

Also disclosed herein is a resin composition comprising the aforesaid phosphorus-containing flame retardant, the resin composition at least comprising a resin of any type and the aforesaid phosphorus-containing flame retardant.

The resin is not particularly limited and may preferably be a low polarity resin, such as comprising a thermosetting resin, a thermoplastic resin or a combination thereof. The thermosetting resin may comprise, but not limited to, any commercially available thermosetting resin, whereas the thermoplastic resin may comprise, but not limited to, any commercially available thermoplastic resin.

A feature of the present disclosure lies in that a low polarity resin is compatible with the aforesaid phosphorus-containing flame retardant and therefore no layer separation occurs.

Another feature of the present disclosure lies in that the aforesaid phosphorus-containing flame retardant, when being added to a resin composition, will not significantly increase the gel time of varnish of the resin composition.

The resin composition may further optionally comprise one or more property modifiers for modifying at least one property of the resin composition, comprising flame retardancy, thermal resistance, dielectric constant, dissipation factor, toughness, reactivity, viscosity and solubility. Specifically, the property modifier may comprise flame retardant, curing accelerator, inorganic filler, surfactant, toughener, solvent or a combination thereof.

Unless otherwise specified, the ratio or content of different components in the resin composition may be adjusted according to needs.

Article Made from Resin Composition

Also disclosed herein is an article made from the aforesaid resin composition, comprising a resin film, a resin-coated copper, a prepreg, a laminate or a printed circuit board.

For example, the resin composition according to each of the various embodiments may be coated on a polyester (PET) film or a polyimide (PI) film, followed by baking and heating to the semi-cured state (B-Stage) to obtain a resin film.

For example, the resin composition according to each of the various embodiments may be coated on a copper foil, followed by baking and heating to the semi-cured state to obtain the resin film with copper foil, such as a resin coated copper (RCC).

For example, the resin composition according to each of the various embodiments may be used to make a prepreg, which has a reinforcement material and a layered structure (insulation layer) formed thereon, wherein the layered structure is made by heating the resin composition to a semi-cured state (B-Stage) at a temperature for example between 120° C. and 160° C. For example, the reinforcement material may be any one of a fiber material, woven fabric, non-woven fabric, liquid crystal resin film, polyester (PET) film and polyimide (PI) film, and the woven fabric preferably comprises fiberglass fabrics. Types of fiberglass fabrics are not particularly limited and may be any commercial fiberglass fabric useful for various printed circuit boards, such as E-glass fabric, D-glass fabric, S-glass fabric, T-glass fabric, L-glass fabric or NE-glass fabric, wherein the fiber may comprise yarns and rovings, in spread form or standard form. Non-woven fabric preferably comprises liquid crystal polymer non-woven fabric, such as polyester non-woven fabric, polyurethane non-woven fabric and so on, but not limited thereto. Woven fabric may also comprise liquid crystal polymer woven fabric, such as polyester woven fabric, polyurethane woven fabric and so on, but not limited thereto. The reinforcement material may increase the mechanical strength of the prepreg. In one preferred embodiment, the reinforcement material can be optionally pre-treated by a silane coupling agent. The prepreg may be further heated and cured to the C-stage to form an insulation layer.

For example, resin compositions of various embodiments of the present disclosure may be made into a laminate, such as a copper-clad laminate, which comprises two copper foils and an insulation layer disposed between the copper foils, wherein the insulation layer is made by curing the resin compositions at high temperature and high pressure, a suitable curing temperature being for example between 190° C. and 220° C. and preferably between 200° C. and 210° C. and a suitable curing time being 90 to 180 minutes and preferably 120 to 150 minutes. The insulation layer may be obtained by curing the aforesaid prepreg or resin film. In one preferred embodiment, the laminate is a copper-clad laminate.

In one embodiment, the laminate may be further processed by trace formation processes to provide a printed circuit board.

EXAMPLES

Materials and reagents used in Preparation Examples, Examples and Comparative Examples disclosed herein are listed below:

Phosphorus-containing hydroxyl aromatic compound:

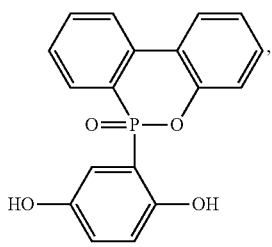

Formula (12)

available from Chembridge International Corp., Ltd.
Phosphorus-containing hydroxyl aromatic compound:

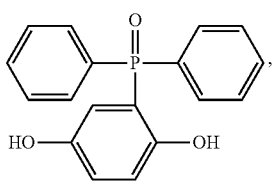

Formula (13)

available from Tokyo Chemical Industry Co., Ltd.
Phosphorus-containing halide:

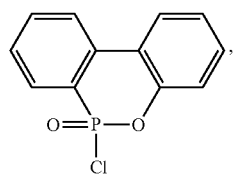

Formula (14)

prepared by Applicant.
Phosphorus-containing halide:

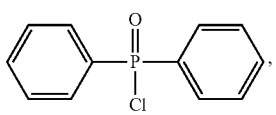

Formula (15)

available from Sigma-Aldrich.
Triethylamine: available from Sigma-Aldrich.
Aluminium chloride: $AlCl_3$, available from Sigma-Aldrich.
Methyl ethyl ketone: MEK, source not limited.
Dimethylacetamide: DMAC, source not limited.
Cycloolefin copolymer: Topas COC 5013, ethylene-cycloolefin copolymer not containing a reactive functional group, available from Topas Advanced Polymers.
Methacrylate-capped polyphenylene oxide resin: SA-9000, available from Sabic.
2,5-Dimethyl-2,5-di(t-butylperoxy)-3-hexyne: 25B, available from NOF Corporation.

Synthesis Example 1

In a three-necked reactor, 0.1 mole of the phosphorus-containing hydroxyl aromatic compound of Formula (12) was dissolved in 200 g of dimethylacetamide (DMAC), followed by adding 0.3 mole of triethylamine and 0.01 mole of aluminium chloride and heated to 150° C., followed by stirring and reacting at 150° C. constant temperature for 1 hour, and followed by adding 0.2 mole of the phosphorus-containing halide of Formula (15) pre-dissolved in 300 g of dimethylacetamide for 6 hours of reaction. After reaction completed, inorganic salt impurities were filtered out, and the filtrate was added with pure water and then extracted to obtain the organic layer, which was then added with methyl ethyl ketone (MEK), stirred at 60° C. to dissolve impurities and then subjected to rotary evaporation to remove the solvent, followed by washing with pure water. The solution is dehydrated and vacuum-dried with a high pressure pump to obtain a phosphorus-containing flame retardant (Product A, containing the phosphorus-containing flame retardants of both Formula (2) and Formula (3)).

The phosphorus content of the phosphorus-containing flame retardant of Formula (2) is about 12.8%, and the phosphorus content of the phosphorus-containing flame retardant of Formula (3) is about 11.8%, both greater than the phosphorus content of the raw material, i.e., the phosphorus content of the phosphorus-containing hydroxyl aromatic compound of Formula (12) is about 9.6%.

Analysis of Product A

The synthesized Product A and the raw material phosphorus-containing hydroxyl aromatic compound of Formula (12) were both subject to GPC analysis; as shown in FIG. 1, the highest peak at the right represents the phosphorus-containing hydroxyl aromatic compound of Formula (12), and the two peaks at the left represent the synthesized Product A (containing the phosphorus-containing flame retardants of both Formula (2) and Formula (3)), wherein the higher peak represents that most products are the phosphorus-containing flame retardant of Formula (2) having

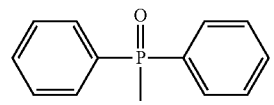

group bonded at both sides, and the lower peak represents that some products are the phosphorus-containing flame retardant of Formula (3) having

Figure 2:
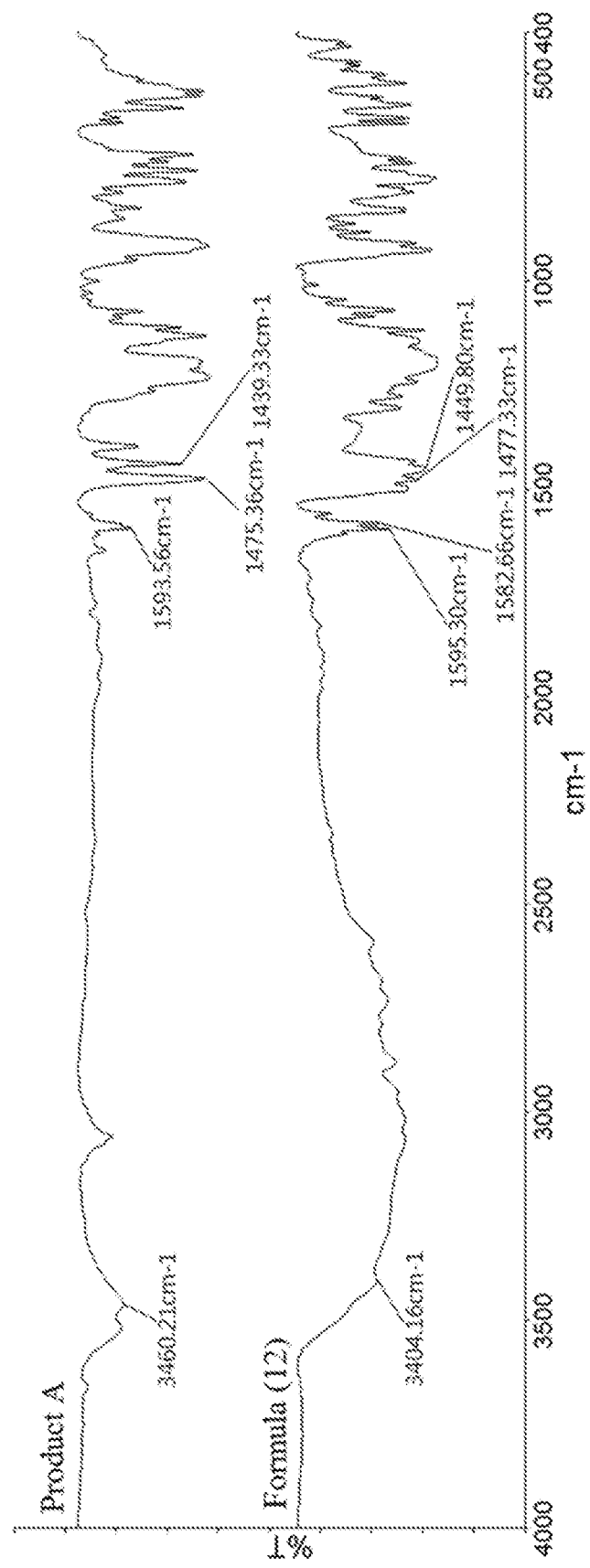
FIG. 2 illustrates the test result of FTIR.

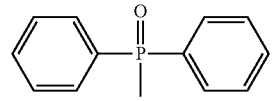

group bonded at single side.
The synthesized Product A and the raw material phosphorus-containing hydroxyl aromatic compound of Formula (12) were both subject to FTIR analysis; as shown in FIG. 2, the lower spectrum reflects the measurement of the raw material phosphorus-containing hydroxyl aromatic compound of Formula (12), and the upper spectrum reflects the measurement of Product A (containing the phosphorus-containing flame retardants of both Formula (2) and Formula (3)). In the lower spectrum, peak at 3404 $cm^{-1}$ represents the absorption of the OH group, and 1449, 1477, 1582, and 1595 $cm^{-1}$ represent the absorption of the benzene ring; in the upper spectrum, peak at 3460 $cm^{-1}$ represents the absorption of the OH group, and 1439, 1475, and 1593 $cm^{-1}$ represent the absorption of the benzene ring. Comparison of the results shows that the upper spectrum has a greater benzene ring: OH group absorption ratio than the lower spectrum, indicating that after the reaction, the

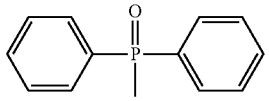

group has been bonded to the OH groups of the raw material phosphorus-containing hydroxyl aromatic compound of Formula (12), and the peak at 3460 cm$^{-1}$ in the upper spectrum is the OH group absorption of the product with

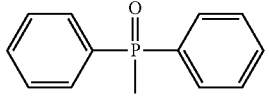

group bonded to single side. FTIR result is in line with GPC measurement.

Figure 3:
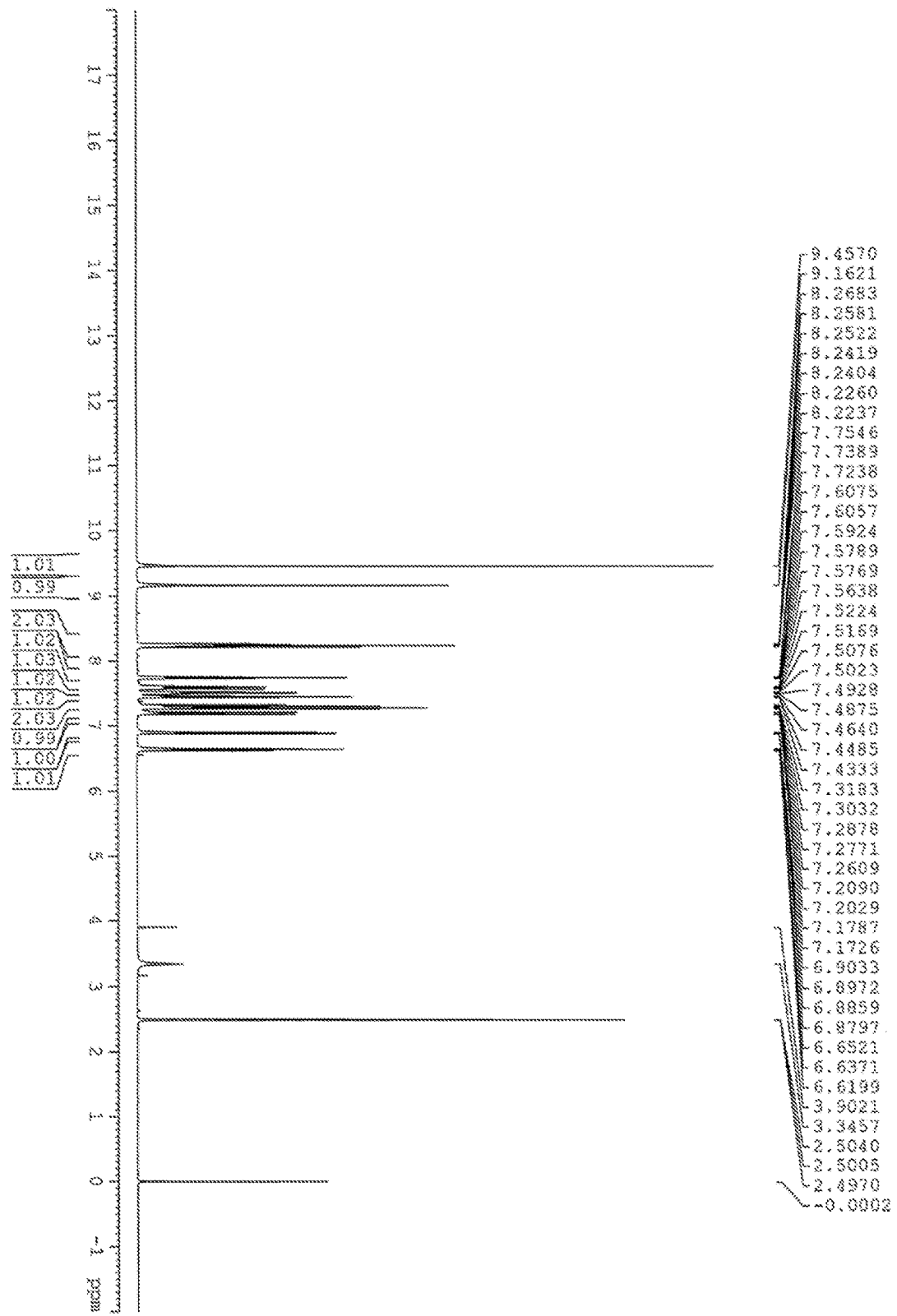
FIG. 3 and FIG. 4 illustrate the test results of NMR.
Figure 4:
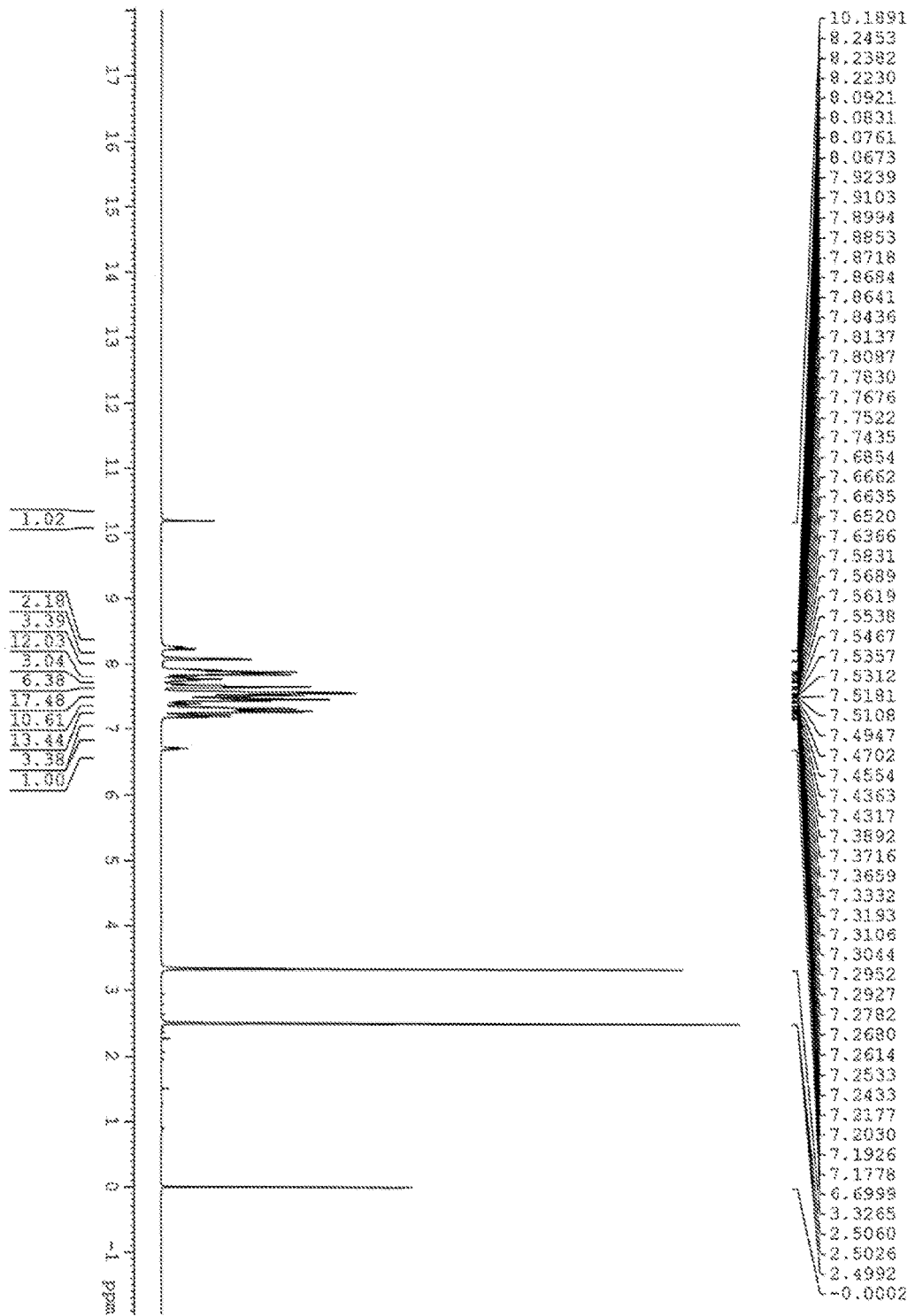

The synthesized Product A and the raw material phosphorus-containing hydroxyl aromatic compound of Formula (12) were both subject to NMR analysis, as illustrated in FIG. 3 (the raw material phosphorus-containing hydroxyl aromatic compound of Formula (12)) and FIG. 4 (the phosphorus-containing flame retardants of both Formula (2) and Formula (3)). In FIG. 3, 9.4570 and 9.1621 ppm singlets are the chemical shifts of the OH groups, and peaks from 8.2683 to 6.6199 ppm represent the chemical shifts of hydrogens on the benzene ring; the integration ratio of each chemical shift and the style of splitting of H absorption peaks on the benzene ring reflect the chemical structure of the raw material phosphorus-containing hydroxyl aromatic compound of Formula (12). In FIG. 4, 10.1891 ppm singlet is the chemical shift of the OH group of the phosphorus-containing flame retardant of Formula (3) formed from the raw material bonded with

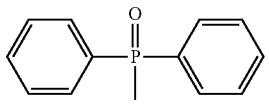

group at single side; in contrast with the two OH chemical shifts in FIG. 3, it can be determined that the raw material phosphorus-containing hydroxyl aromatic compound of Formula (12) has been bonded at single side with the

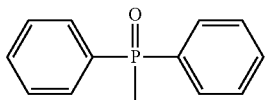

group. On the other hand, according to the chemical shifts of hydrogens on the benzene ring of Product A from 8.2453 to 6.6999 ppm, the sum of integrations of each chemical shift and the style of splitting of the H absorption peak on the benzene ring (for the phosphorus-containing hydroxyl aromatic compound of Formula (12), H of OH group:H of benzene ring 2:11; for Product A, H of OH group:H of benzene ring 1:72), the chemical structure of Product A (mixture of the phosphorus-containing flame retardant of Formula (2) and the phosphorus-containing flame retardant of Formula (3)) can be inferred, and the ratio of content of Formula (2) and Formula (3) is calculated to be about 1.7:1.

If the product synthesized contains two or more different phosphorus-containing flame retardants as described herein, according to different needs, various methods can be used to separate the phosphorus-containing flame retardants. For example, the difference in structural polarity of the flame retardants enables the use of column chromatography to separate various different flame retardants. In one embodiment, the separation may be performed as follow: use a solvent mixture of ethyl acetate:hexane=1:5 as the developing solution, and use a TLC sheet (silica sheet) to determine the difference in polarity of the two flame retardants; set up glass columns loaded with solid adsorbent such as silica gel which has been wet by eluent; use a solvent mixture (ethyl acetate:hexane=1:40) as the initial eluent to collect and remove low polarity impurities; use a solvent mixture (ethyl acetate:hexane=1:15) as the intermediate eluent, collect the organic solution A containing the phosphorus-containing flame retardant of Formula (2) with 10 to 15 tubes, and track the collection process with a TLC sheet; after the collection of the organic solution A containing the phosphorus-containing flame retardant of Formula (2) has been confirmed, use a solvent mixture (ethyl acetate:hexane=1:10) as the subsequent eluent to collect and remove intermediate polarity impurities; use a solvent mixture (methanol:hexane=1:3) as the final eluent to collect the organic solution B containing the phosphorus-containing flame retardant of Formula (3) with 20 to 25 tubes and track the collection process with a TLC sheet; confirm complete collection of the organic solution B containing the phosphorus-containing flame retardant of Formula (3); condense the organic solution A and the organic solution B and remove organic solvent therefrom with a high pressure pump filter device to respectively obtain the phosphorus-containing flame retardant of Formula (2) and the phosphorus-containing flame retardant of Formula (3).

Synthesis Example 2

In a three-necked reactor, 0.1 mole of the phosphorus-containing hydroxyl aromatic compound of Formula (12) was dissolved in 200 g of dimethylacetamide (DMAC), followed by adding 0.3 mole of triethylamine and 0.01 mole of aluminium chloride and heated to 150° C., followed by stirring and reacting at 150° C. constant temperature for 1 hour, and followed by adding 0.2 mole of the phosphorus-containing halide of Formula (14) pre-dissolved in 300 g of dimethylacetamide for 6 hours of reaction; after reaction completed, inorganic salt impurities were filtered out, and the filtrate was added with pure water and then extracted to obtain the organic layer, which was then added with methyl ethyl ketone (MEK), stirred at 60° C. to dissolve impurities and then subjected to rotary evaporation to remove the solvent, followed by washing with pure water. The solution is then dehydrated and vacuum-dried with a high pressure pump to obtain a phosphorus-containing flame retardant (Product B, containing the phosphorus-containing flame retardants of both Formula (4) and Formula (5)).

Synthesis Example 3

In a three-necked reactor, 0.1 mole of the phosphorus-containing hydroxyl aromatic compound of Formula (13)

was dissolved in 200 g of dimethylacetamide (DMAC), followed by adding 0.3 mole of triethylamine and 0.01 mole of aluminium chloride and heated to 150° C., followed by stirring and reacting at 150° C. constant temperature for 1 hour, and followed by adding 0.2 mole of the phosphorus-containing halide of Formula (15) pre-dissolved in 300 g of dimethylacetamide for 6 hours of reaction; after reaction completed, inorganic salt impurities were filtered out, and the filtrate was added with pure water and then extracted to obtain the organic layer, which was then added with methyl ethyl ketone (MEK), stirred at 60° C. to dissolve impurities and then subjected to rotary evaporation to remove the solvent, followed by washing with pure water. The solution is then dehydrated and vacuum-dried with a high pressure pump to obtain a phosphorus-containing flame retardant (Product C, containing the phosphorus-containing flame retardants of both Formula (9) and Formula (10)).

Property Measurement

Resin compatibility test: cycloolefin copolymer Topas COC 5013 and Product A were added to a solvent mixture of dimethylacetamide (DMAC) and toluene and fully stirred as the Example 1 (E1), which is then placed at room temperature (25° C.) for 12 hours to observe whether layer separation occurs. In addition, Product A was replaced by the phosphorus-containing hydroxyl aromatic compound of Formula (12) as the Comparative Example C1, and Product A was replaced by the phosphorus-containing hydroxyl aromatic compound of Formula (12) and the phosphorus-containing halide of Formula (15) as the Comparative Example C2; both C1 and C2 were subject to the resin compatibility test, and the results are listed in Table 1. Generally, poor resin compatibility results in layer separation; if a resin with poor compatibility is used to prepare a varnish and a fiberglass fabric is impregnated with such varnish and then laminated to make a copper-clad laminate, interlayer delamination and unstable quality of the laminate will be observed.

TABLE 1

| | E1 | C1 | C2 |
|---|---|---|---|
| Component and amount (in part by weight (PHR)) | Topas COC 5013: 100<br>Product A: 5<br>DMAC: 45<br>Toluene: 50 | Topas COC 5013: 100<br>Formula (12): 5<br>DMAC: 45<br>Toluene: 50 | Topas COC 5013: 100<br>Formula (12): 1.7<br>Formula (15): 3.3<br>DMAC: 45<br>Toluene: 50 |
| Result | Compatible and no layer separation observed | Incompatible and layer separation observed | Incompatible and layer separation observed |

Synthesis Example 4

In a three-necked reactor, 0.1 mole of the phosphorus-containing hydroxyl aromatic compound of Formula (13) was dissolved in 200 g of dimethylacetamide (DMAC), followed by adding 0.3 mole of triethylamine and 0.01 mole of aluminium chloride and heated to 150° C., followed by stirring and reacting at 150° C. constant temperature for 1 hour, and followed by adding 0.2 mole of the phosphorus-containing halide of Formula (14) pre-dissolved in 300 g of dimethylacetamide for 6 hours of reaction; after reaction completed, inorganic salt impurities were filtered out, and the filtrate was added with pure water and then extracted to obtain the organic layer, which was then added with methyl ethyl ketone (MEK), stirred at 60° C. to dissolve impurities and then subjected to rotary evaporation to remove the solvent, followed by washing with pure water. The solution is then dehydrated and vacuum-dried with a high pressure pump to obtain a phosphorus-containing flame retardant (Product D, containing the phosphorus-containing flame retardants of both Formula (8) and Formula (11)).

Gel time of varnish: compositions containing a thermosetting resin SA-9000, dimethylacetamide and toluene as the solvent mixture, and a curing initiator 25B were used, according to the amount specified in Table 2, to form varnishes; 50 mL of each sample was placed on a cure plate of 171±0.5° C., the tapered end of a stick was stroked circularly from the center of the varnish sample toward the periphery, and the diameter of varnish area is maintained at 1.90 to 2.19 cm. Stroking was continued when the varnish became stiff until the largest piece broke up, and the timer was stopped immediately, with the total elapsed time recorded as the gel time (S/G).

TABLE 2

| | C3 | E2 | C4 | C5 | C6 |
|---|---|---|---|---|---|
| Component and amount (in part by weight (PHR)) | SA-9000: 100<br>25B: 0.5<br>DMAC: 45<br>Toluene: 50 | Product A: 5<br>SA-9000: 100<br>25B: 0.5<br>DMAC: 45<br>Toluene: 50 | Formula (12): 5<br>SA-9000: 100<br>25B: 0.5<br>DMAC: 45<br>Toluene: 50 | Formula (15): 5<br>SA-9000: 100<br>25B: 0.5<br>DMAC: 45<br>Toluene: 50 | Formula (12): 1.7<br>Formula (15): 3.3<br>SA-9000: 100<br>25B: 0.5<br>DMAC: 45<br>Toluene: 50 |
| S/G (second) | 260 | 253 | 508 | 365 | 482 |

Water absorption rate: as shown in Table 3. Each component was placed in an aluminum tray and baked in an oven at 105±10° C. for 1 hour, and then removed from the oven, cooled to room temperature and weighed to give a weight value W1; each component was then placed at room temperature (60% relative humidity) for 7 days and then weighed again to give a weight value W2. The water absorption rate of each component was calculated as (water absorption rate (W %)=[(W2−W1)/W1]×100%).

TABLE 3

| | Product A | Formula (12) | Formula (15) | Mixture of Formula (12) and Formula (15) (molar ratio 1:2) |
|---|---|---|---|---|
| Water absorption rate | 0.12% | 0.38% | 0.23% | 0.31% |

According to the tests described above, it is apparent that the present disclosure provides the advantages of high phosphorus content (i.e., the phosphorus content of the phosphorus-containing flame retardant of Formula (2) is about 12.8%, and the phosphorus content of the phosphorus-containing flame retardant of Formula (3) is about 11.8%, both greater than the phosphorus content (about 9.6%) of the phosphorus-containing hydroxyl aromatic compound of Formula (12)), higher compatibility, not increasing gel time of varnish and low water absorption rate.

For example, as illustrated in Table 1, compared with a phosphorus-containing hydroxyl aromatic compound or a mixture containing a phosphorus-containing hydroxyl aromatic compound and a phosphorus-containing halide which have not been reacted, when the phosphorus-containing flame retardants disclosed herein are added to a low polarity resin system (e.g., E1), a better compatibility is achieved and layer separation of the resin system can be avoided.

For example, as illustrated in Table 2, compared with a phosphorus-containing hydroxyl aromatic compound, a phosphorus-containing halide or a mixture containing a phosphorus-containing hydroxyl aromatic compound and a phosphorus-containing halide which have not been reacted, when the phosphorus-containing flame retardants disclosed herein are added to a thermosetting resin composition, the gel time of varnish is not increased and is maintained at a range of 250±30 seconds, which maintains the reactivity of the resin composition and enables the production of prepregs with a reasonable baking temperature and machine operation speed, thereby reducing the costs in energy, time and labor.

For example, as illustrated in Table 3, compared with a phosphorus-containing hydroxyl aromatic compound, a phosphorus-containing halide or a mixture containing a phosphorus-containing hydroxyl aromatic compound and a phosphorus-containing halide which have not been reacted, one or more phosphorus-containing flame retardants disclosed herein have a desirably low water absorption rate of 0.12%.

The above detailed description is merely illustrative in nature and is not intended to limit the embodiments of the subject matter or the application and uses of such embodiments. As used herein, the term "exemplary" means "serving as an example, instance, or illustration." Any implementation described herein as exemplary is not necessarily to be construed as preferred or advantageous over other implementations.

Moreover, while at least one exemplary example or comparative example has been presented in the foregoing detailed description, it should be appreciated that a vast number of variations exist. It should also be appreciated that the exemplary one or more embodiments described herein are not intended to limit the scope, applicability, or configuration of the claimed subject matter in any way. Rather, the foregoing detailed description will provide those skilled in the art with a convenient guide for implementing the described one or more embodiments. Also, various changes can be made in the function and arrangement of elements without departing from the scope defined by the claims, which include known equivalents and foreseeable equivalents at the time of filing this patent application.

What is claimed is:

1. A phosphorus-containing flame retardant of Formula (1):

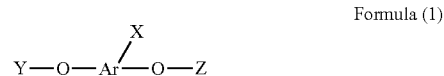

Formula (1)

wherein X represents

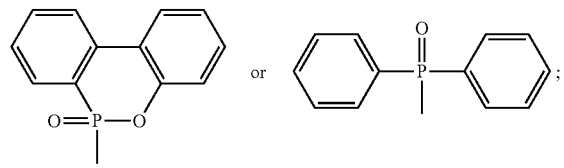 [SMILES: CP1(=O)Oc2ccccc2-c2ccccc21 ; CP(=O)(c1ccccc1)c1ccccc1]

Ar represents an aromatic group; and

Y and Z individually represent

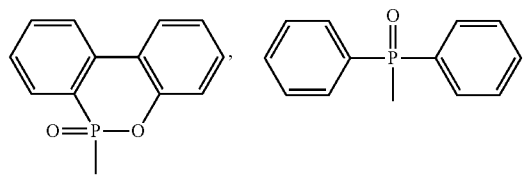

or hydrogen, and at least one of Y and Z is not hydrogen.

2. The phosphorus-containing flame retardant of claim 1, wherein Ar represents benzene, naphthalene or biphenyl.

3. The phosphorus-containing flame retardant of claim 1, which comprises a structure of Formula (1-1), Formula (1-2) or Formula (1-3):

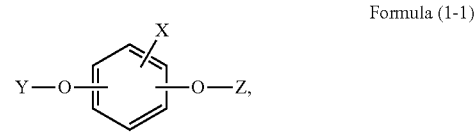

Formula (1-1)

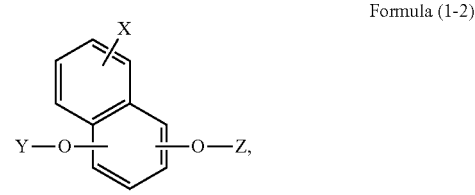

Formula (1-2)

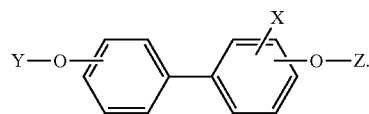

Formula (1-3)

4. The phosphorus-containing flame retardant of claim 1, which comprises a structure of Formula (1-4):
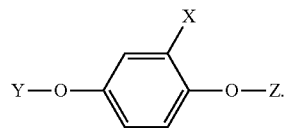
Formula (1-4)
5. The phosphorus-containing flame retardant of claim 1, which comprises a structure of any one of Formula (2) to Formula (11):
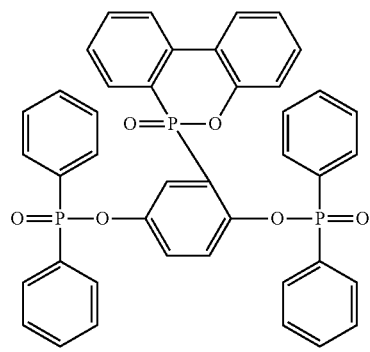
Formula (2)
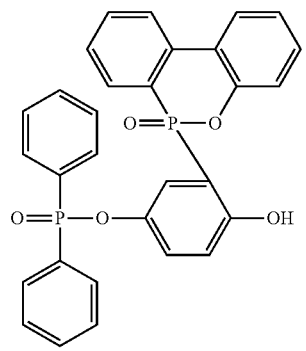
Formula (3)
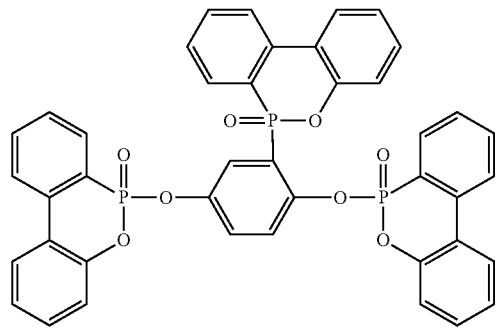
Formula (4)
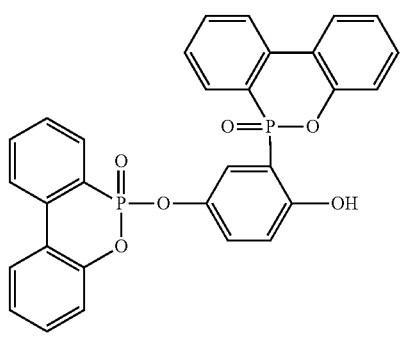
Formula (5)
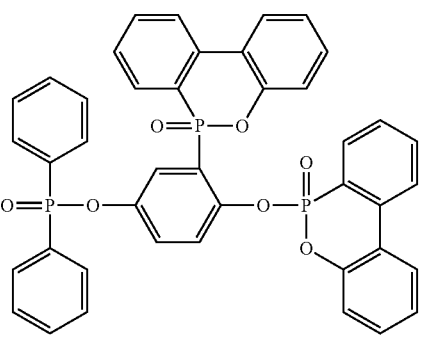
Formula (6)
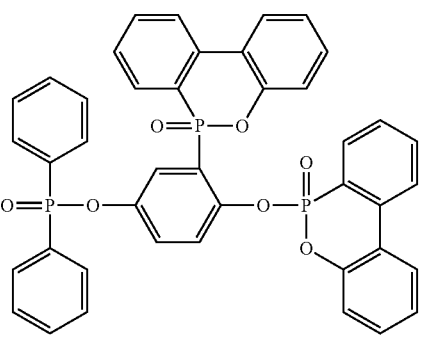
Formula (7)
Formula (8)
Formula (9)
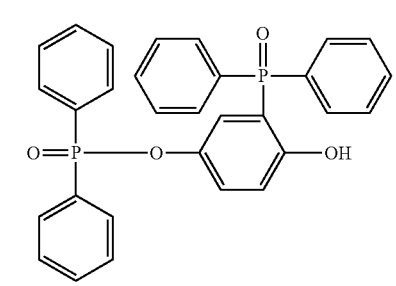

Formula (10)

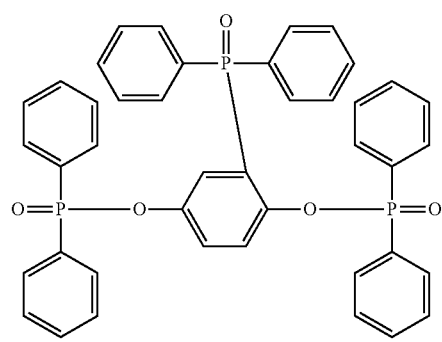

Formula (11)

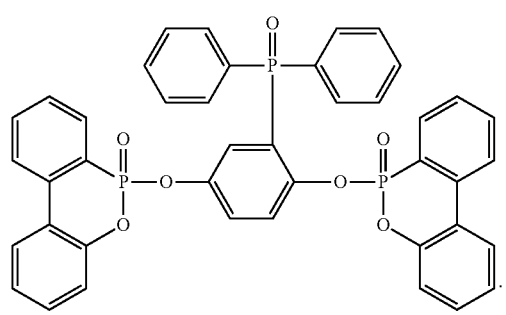

6. The phosphorus-containing flame retardant of claim 1, having a phosphorus content of between 10% and 15%.

7. The phosphorus-containing flame retardant of claim 1, having a water absorption rate of less than 0.20%.

8. A method of preparing the phosphorus-containing flame retardant of claim 1, comprising reacting a phosphorus-containing hydroxyl aromatic compound and a phosphorus-containing halide in the presence of a catalyst.

9. The method of claim 8, wherein the phosphorus-containing hydroxyl aromatic compound comprises any one of the following structures:

Formula (3)

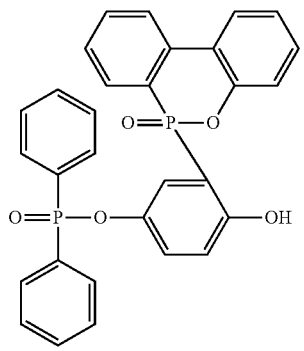

Formula (5)

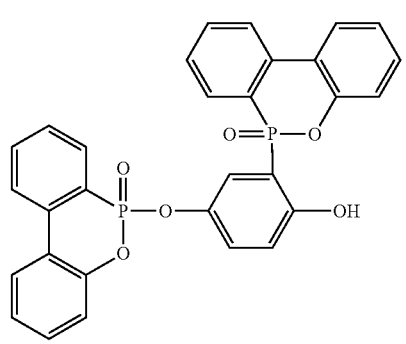

Formula (8)

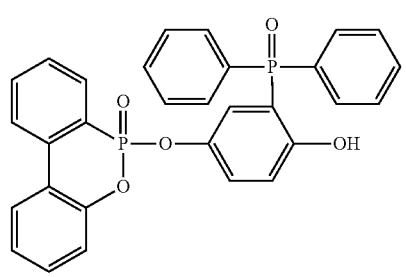

Formula (9)

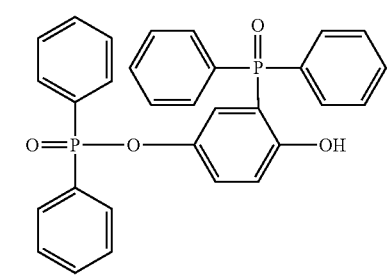

Formula (12)

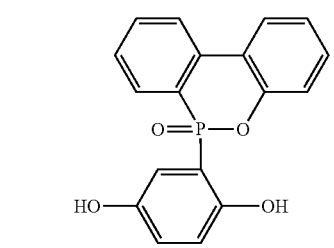

Formula (13)

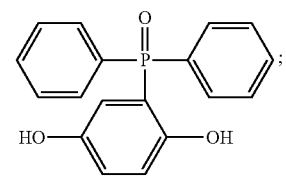

wherein the phosphorus-containing halide comprises a structure of Formula (14) or Formula (15):

Formula (14)

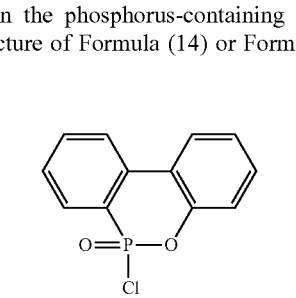

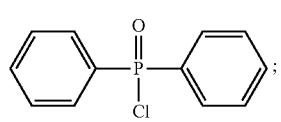

Formula (15)

wherein the catalyst comprises an alkaline compound and a Lewis acid; and wherein the phosphorus-containing hydroxyl aromatic compound and the phosphorus-containing halide have a molar ratio of between 1:1 and 1:5.

10. A resin composition comprising a resin and at least one phosphorus-containing flame retardant of claim 1.

11. The resin composition of claim 10, further comprising a property modifier.

12. An article made from the resin composition of claim 10, comprising a resin film, a resin-coated copper, a prepreg, a laminate or a printed circuit board.

* * * * *